United States Patent [19]

Kohno et al.

[11] Patent Number: 5,764,816

[45] Date of Patent: Jun. 9, 1998

[54] IMAGE FORMING APPARATUS CAPABLE OF CONVERTING THE RESOLUTION

[75] Inventors: Takashi Kohno; Hiroyuki Fujita, both of Osaka; Hideo Azumai, Toyonaka; Satoshi Iwatsubo, Osaka, all of Japan

[73] Assignee: Mita Industrial Co., Ltd., Osaka, Japan

[21] Appl. No.: 788,564

[22] Filed: Jan. 24, 1997

Related U.S. Application Data

[63] Continuation of Ser. No. 368,432, Jan. 4, 1995, abandoned.

[30] Foreign Application Priority Data

Jan. 13, 1994 [JP] Japan .................. 6-002202

[51] Int. Cl.[6] ........................................ H04N 1/40
[52] U.S. Cl. .................. 382/299; 358/448; 358/462; 382/176
[58] Field of Search .................. 358/447, 448, 358/456–458, 462–464, 442, 468; 382/258, 298, 176–178, 299; H04N 1/40

[56] References Cited

U.S. PATENT DOCUMENTS

| | | | |
|---|---|---|---|
| 4,841,375 | 6/1989 | Nakajima et al. | 358/442 |
| 5,327,258 | 7/1994 | Ueda | 358/447 |
| 5,424,854 | 6/1995 | Hashimoto | 358/456 |
| 5,517,331 | 5/1996 | Murai et al. | 358/404 |

*Primary Examiner*—Kim Yen Vu
*Attorney, Agent, or Firm*—Beveridge, Degrandi, Weilacher, Young, LLP

[57] ABSTRACT

According to the image processing apparatus of the present invention, image data are entered with an input resolution of 16 dots/mm, yet allowing the use of a conventional image processing system with a resolution of 8 dots/mm, and there can be produced an image better in quality than a conventional one. First, pixel data with an input resolution of 16 dots/mm are subjected to resolution conversion using a resolution converting unit 21. The resolution conversion is made by an odd-numbered pixel thinning processing when the apparatus mode is set to a binary mode, and by a two pixel averaging processing when the apparatus mode is set to a half-tone mode. Then, pixel data of which resolution has been converted into 8 dots/mm, are supplied to an image processing unit 22, where an image processing is then executed on the pixel data.

18 Claims, 5 Drawing Sheets

IMAGE FORMING APPARATUS CAPABLE OF CONVERTING THE RESOLUTION

This application is a continuation of application Ser. No. 08/368,432, filed Jan. 4, 1995, now abandoned, which application is entirely incorporated herein by reference.

BACKGROUND OF THE INVENTION

1. Field of the Invention

The present invention relates to an image processing apparatus such as a facsimile apparatus or the like, and more particularly to the conversion of resolution of an image to be processed.

2. Description of the Prior Art

The following description will be made with a facsimile apparatus taken as an example. As shown in FIG. 5, the facsimile apparatus generally has an image sensor 1, an image processing unit 2, a transmission processing unit 3 and a printer 5.

When transmitting a document image, the document image to be transmitted is read by the image sensor 1, and the image data of the document thus read are given to the image processing unit 2, where a predetermined processing is executed on the image data. The image processed data are then supplied to the transmission processing unit 3, where the data are transmitted.

When copying a document by this facsimile apparatus, a document image is read by the image sensor 1, and the image data of the document thus read are processed by the image processing unit 2 and then supplied to the printer 5.

When the facsimile apparatus has received data, the received data are supplied to the printer 5, where the received data are printed out on paper or the like.

In the facsimile apparatus of prior art, the data resolutions of the respective components are uniform, i.e., 8 dots/mm for the image sensor 1, 8 dots/mm for the image processing unit 2 and 200 dpi (8 dots/mm) for the transmission processing unit 3. However, the resolution of the printer 5 is often 400 dpi (16 dots/mm). Accordingly, there is disposed an output correction unit 6 for converting the resolution of image data to be entered into the printer 5 from 8 dots/mm into 16 dots/mm.

The reason why the facsimile apparatus of the prior art uses the printer 5 with a resolution of 16 dots/mm as above-mentioned, is because an economical printer with high-resolution can be commercially available due to remarkable technical progress of the printer 5.

However, the conventional facsimile apparatus having the arrangement as shown in FIG. 5 presents the problem that the high-resolution printer 5 cannot fully be put to best use. More specifically, since the resolution of image data to be entered from the image sensor 1 is 8 dots/mm, there is required correction according to the resolution of the printer 5, causing the resulting image to be coarse.

On the other hand, the technology for the image sensor 1 has recently been developed such that an image sensor with a resolution of 16 dots/mm can economically be acquired. The use of such an image sensor with a resolution of 16 dots/mm in a facsimile apparatus, assures matching with the resolution of the printer 5. This provides image data better than the conventional image data.

The foregoing requires the image processing unit 2 to present a resolution of 16 dots/mm. However, if the image processing unit 2 is changed to a higher-resolution unit, the arrangement becomes complicated with the cost considerably increased. Accordingly, such a higher-resolution image processing unit can hardly be employed in most of facsimile apparatus, in particular those of the popular type. Further, the facsimile apparatus manufacturers are unwilling to accept the fact that there cannot be used any more an image processing system with a resolution of 8 dots/mm so far manufactured by themselves.

SUMMARY OF THE INVENTION

It is an object of the present invention to provide an image processing apparatus which employs an input device (image sensor) with a resolution of 16 dots/mm for example, yet allowing the use of an image processing unit with a resolution of 8 dots/mm identical with that of a conventional image processing unit, and with which there can be produced an image better in quality than a conventional one.

The present invention provides an image processing apparatus comprising: image data reading means for optically reading image data with higher resolution; means for converting the image data read by the image data reading means into digital data; resolution converting means for converting the higher-resolution image data which have been converted into the digitalized data, into lower-resolution image data such that the lower-resolution image data are matched with a lower-resolution device disposed downstream of the resolution converting means; and image processing means for executing a predetermined image processing on the image data of which resolution has been converted into lower resolution by the resolution converting means.

The present invention also provides a resolution converting method to be applied to the image processing apparatus above-mentioned.

According to the present invention, image data are optically read by the image data reading means with higher resolution and then converted into digital image data. The higher-resolution image data thus converted into the digital data, are converted into lower-resolution image data by the resolution converting means. For example, the read image data of which resolution is 16 dots/mm, are converted, by the resolution converting means, into data of which resolution is 8 dots/mm. The lower-resolution image data thus converted are subjected to a predetermined image processing using the image processing means.

According to a preferred mode of the present invention, the resolution converting manner is changed according to an image processing mode when such an image processing mode is set in the image processing apparatus. For example, the resolution conversion is made by a pixel thinning processing when a binary mode is set as the image processing mode. Such resolution conversion provides image data excellent in expression of edges and fine lines thereof.

According to another preferred mode of the present invention, the resolution conversion is made by averaging a plurality of pixels, for example two pixels, when a half-tone mode is set as the image processing mode. Such resolution conversion provides image data excellent in expression of gradation of a half-tone since all the data before subjected to resolution conversion, are reflected in the resulting data.

Thus, according to the present invention, image data read by the image reading sensor with higher resolution can be processed by an image processing apparatus with lower resolution. Further, since resolution conversion is made before an image processing is executed on the image data, there can be produced good image data as the data supplied after image processing.

Further, according to the present invention, pixel data after being converted are brought to a state that is designed to suit the mode to be used by the image processing unit. Thus, after the data have been subjected to a subsequent image processing, a good image can be produced.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
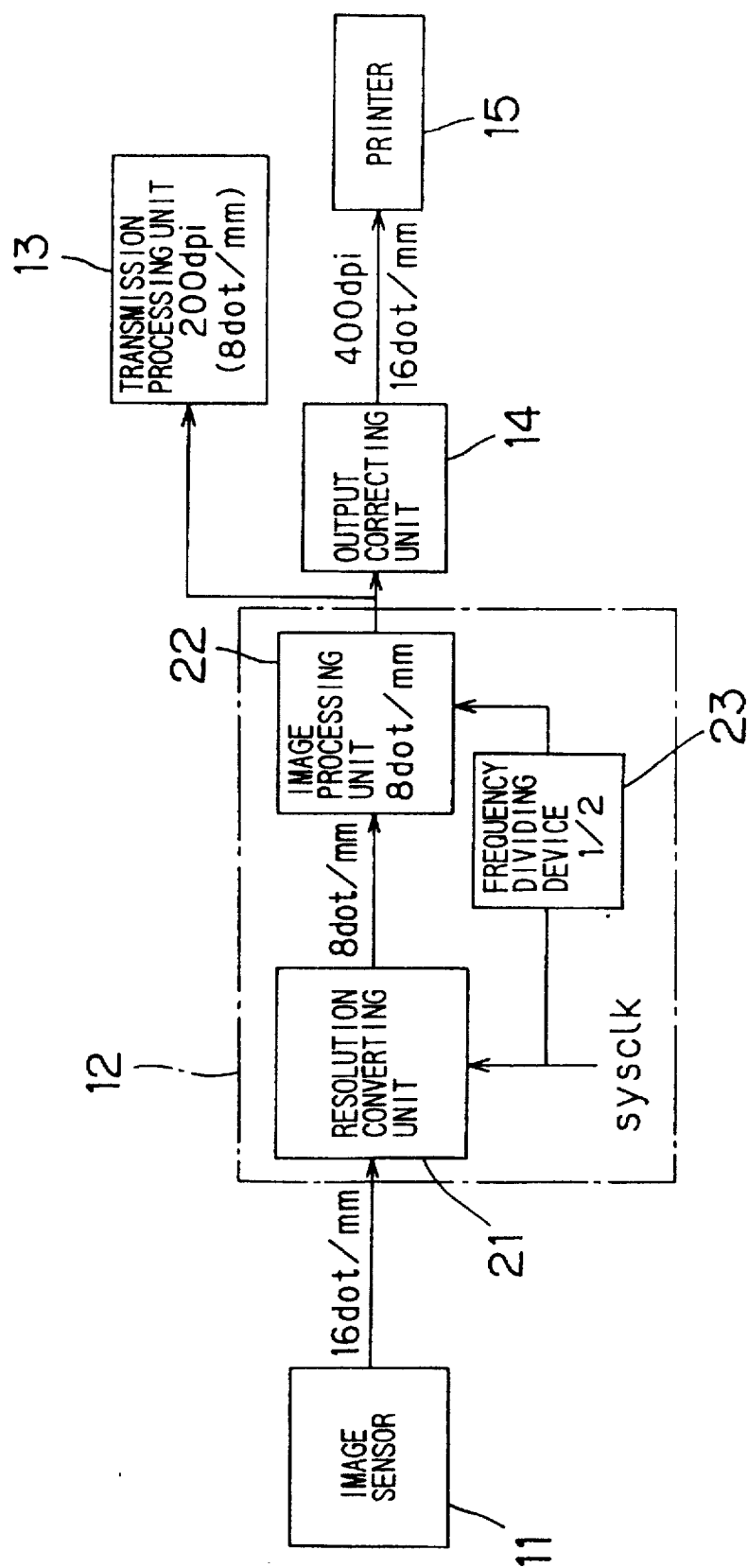
FIG. 1 is a block diagram of a facsimile apparatus having a resolution converting unit according to an embodiment of the present invention.

FIG. 1 is a block diagram illustrating the arrangement featuring a facsimile apparatus according to an embodiment of the present invention.

With reference to FIG. 1, image data read by an image sensor 11 are supplied to an image processing block 12 where a predetermined image processing is executed on the image data. When the image data are those for facsimile transmission, the image data are supplied to a transmission processing unit 13 from the image processing block 12. When the image data are those to be printed out, the image data are supplied from the image processing block 12 to a printer 15 through an output correcting unit 14.

In the facsimile apparatus in this embodiment, the data are read by the image sensor 11 with a resolution of 16 dots/mm. Accordingly, image data with a resolution of 16 dots/mm are supplied to the image processing block 12.

The image processing block 12 comprises a resolution converting unit 21, an image processing unit 22 and a frequency dividing device 23.

In the resolution converting unit 21, 16-dot/mm image data entered from the image sensor 11 are first converted from analog data into digital data, and the resulting digitalized 16-dot/mm image data are then converted as to resolution into 8-dot/mm image data. An analog/digital converting unit may be disposed independently from the resolution converting unit 21 before or after the resolution converting unit 21.

Figure 2:
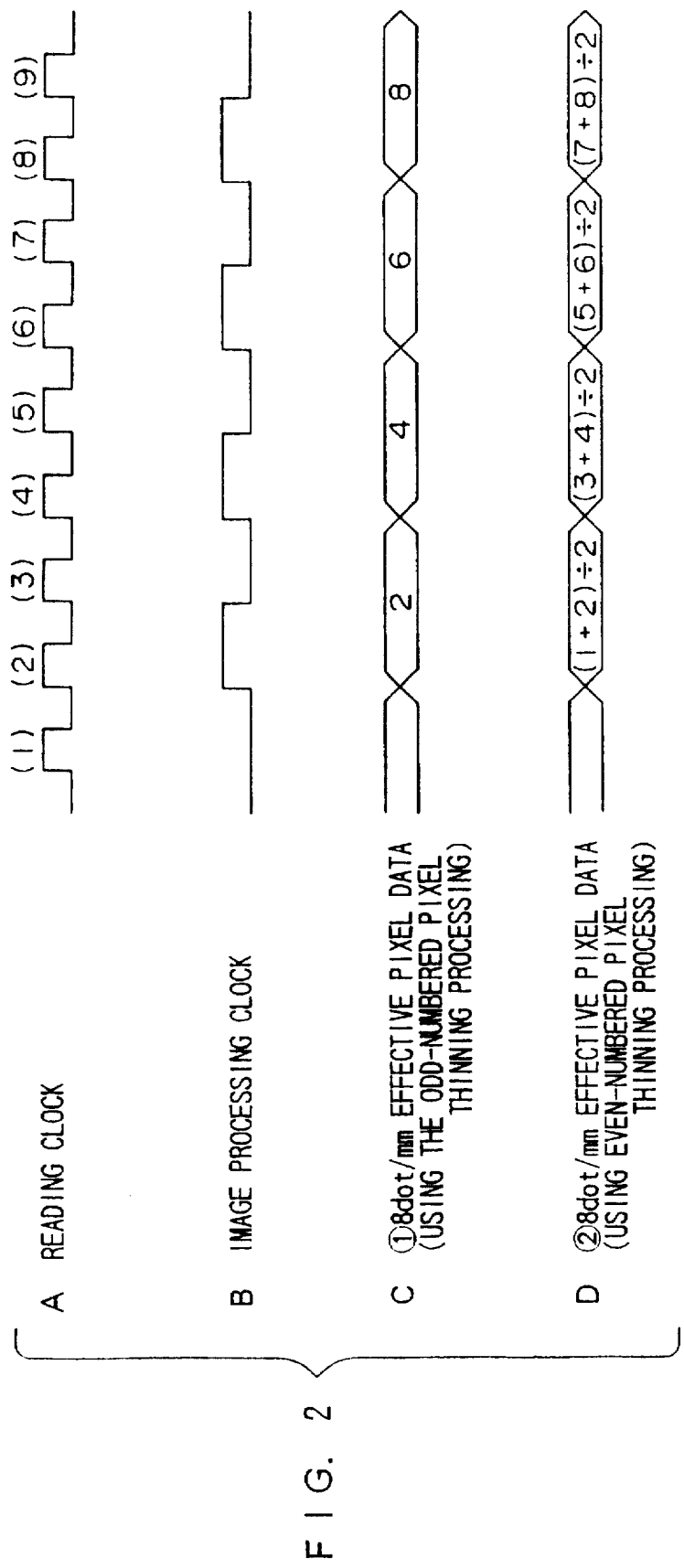
FIG. 2 is a timing chart illustrating the operation of resolution conversion in FIG. 1.

FIG. 2 shows a timing chart of resolution conversion.

In resolution conversion, data are read at system clock sysclk of the 16-dot/mm system similar to that used in the image sensor 11. The data thus read are converted as to resolution from 16 dots/mm into 8 dots/mm by an odd-numbered pixel thinning processing or a two pixel averaging processing according to a preset mode.

More specifically, data are successively latched per pixel at reading clock sysclk shown in FIG. 2A. For example, when a binary mode (white/black mode) has been set in the facsimile apparatus, only the pixel data latched at the even numbered clocks out of the reading clock sysclk, are supplied as shown in FIG. 2C. That is, the pixel data latched at the odd-numbered clocks out of the reading clock sysclk, are thinned out such that only the pixel data at the even-numbered clocks are supplied as effective pixel data. This converts the resolution into 8 dots/mm. When there is used the resolution conversion using the odd numbered pixel thinning processing, this reduces the chances of the expression of edges or fine lines being injured, thus providing a good binary image. It is a matter of course to use an even-numbered pixel thinning processing instead of the odd numbered pixel thinning processing.

On the other hand, for example when a half-tone mode has been set in the facsimile apparatus, it is preferable to convert the resolution by the two pixel averaging processing instead of the pixel thinning processing. In FIG. 2, in synchronism with the even-numbered reading clocks sysclk (2), (4), (6), . . . . the pixel data latched at such even-numbered clock and the pixel data latched at the previous clock are added to each other, and the average value thereof is then obtained and supplied as effective pixel data. When the resolution is converted by this two pixel averaging processing, all the pixels latched at 16 dots/mm are reflected in the effective pixels. Thus, the resulting effective pixel data are excellent in expression of gradation of a half-tone.

The image data of which resolution has been converted from 16 dots/mm to 8 dots/mm by the resolution converting unit 21, are supplied to the image processing unit 22. As the image processing unit 22, there is used a conventional one of which resolution is 8 dots/mm. Accordingly, the reference clock based on which the image processing unit 22 executes a processing, is an image processing clock (1/2)sysclk as shown in FIG. 2B in which the reading clock sysclk is being divided by the ½ frequency dividing device 23.

Thus, when the image sensor 11 with a resolution of 16 dots/mm is used to provide an input resolution of 16 dots/mm, the resolution is first converted before an image processing is executed to input data. Accordingly, the 8-dot/mm image processing unit 22 of prior art can be used, as it is, for the converted data. More specifically, the 8-dot/mm image processing system usually used in the facsimile apparatus of prior art can be utilized.

At the image processing unit 22, a predetermined image processing is executed on the image data. Examples of the image processing include a shading correction processing, an area separating processing, a zoom processing, a smoothing processing, an error diffusion procession, isolation, a removal processing and the like. The specific contents of these processings are discussed in U.S. patent application Ser. No. 08/089,327 now U.S. Pat. No. 5,646,745 filed by the applicant of the present invention. These processing contents themselves are not directly related to the characteristics of the present invention, and therefore not discussed here.

Figure 3:
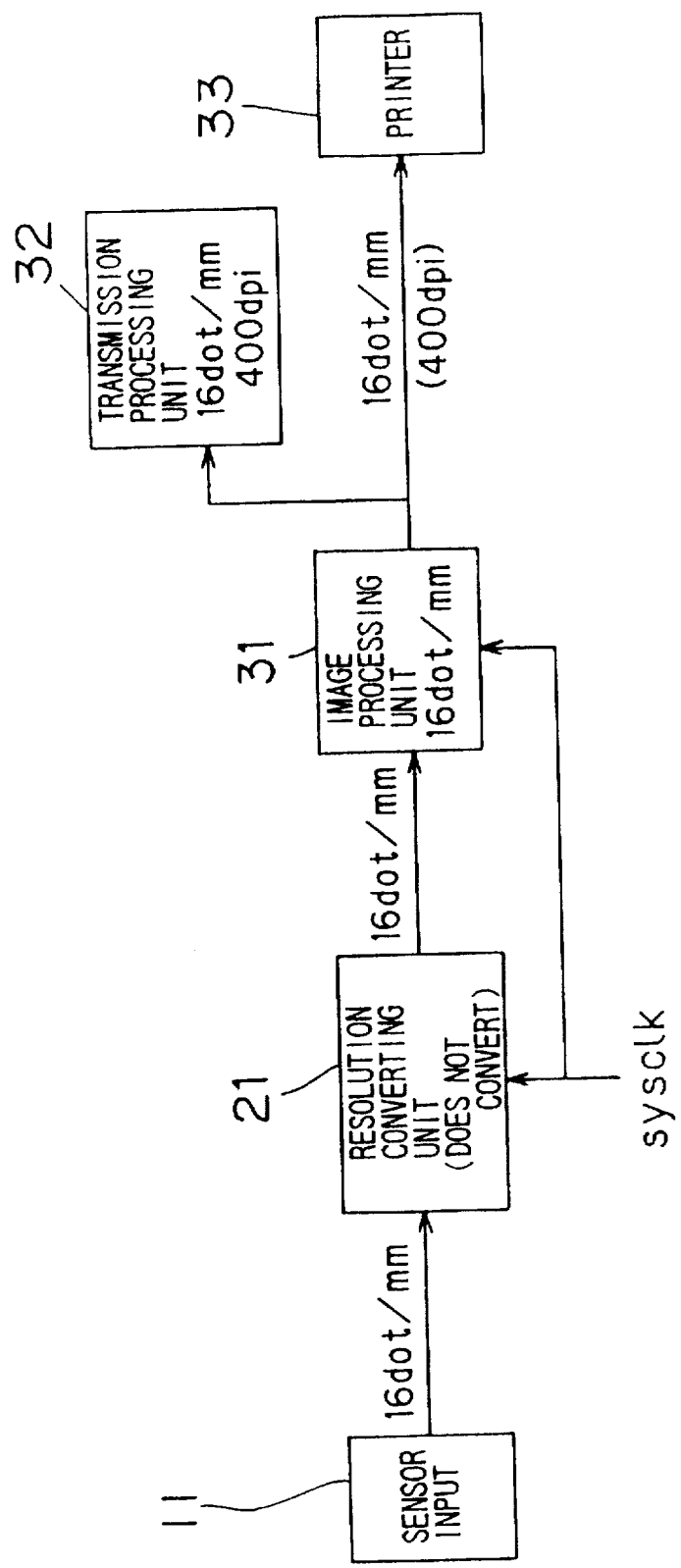
FIG. 3 is a block diagram of a system according to the present invention where a high-resolution image processing unit is used.
Figure 4:
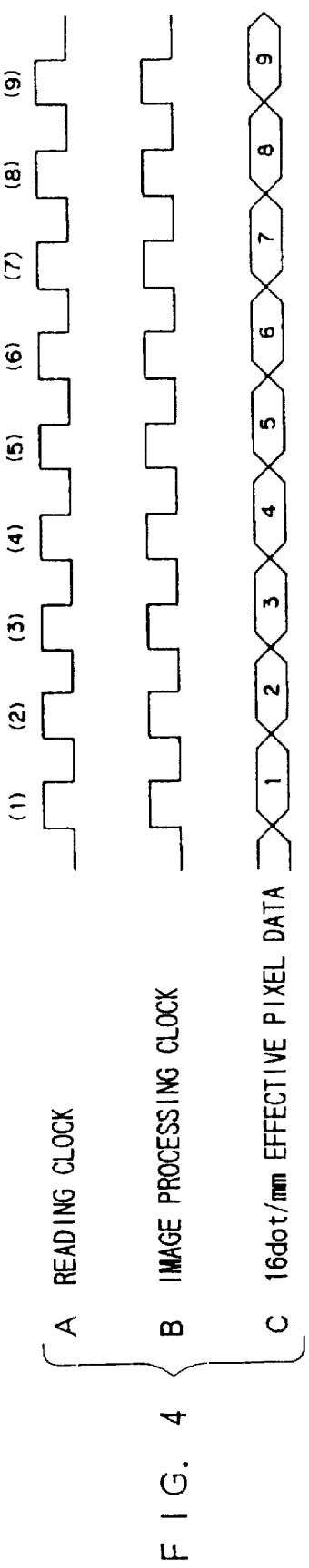
FIG. 4 is a timing chart illustrating the operation of the apparatus shown in FIG. 3.
Figure 5:
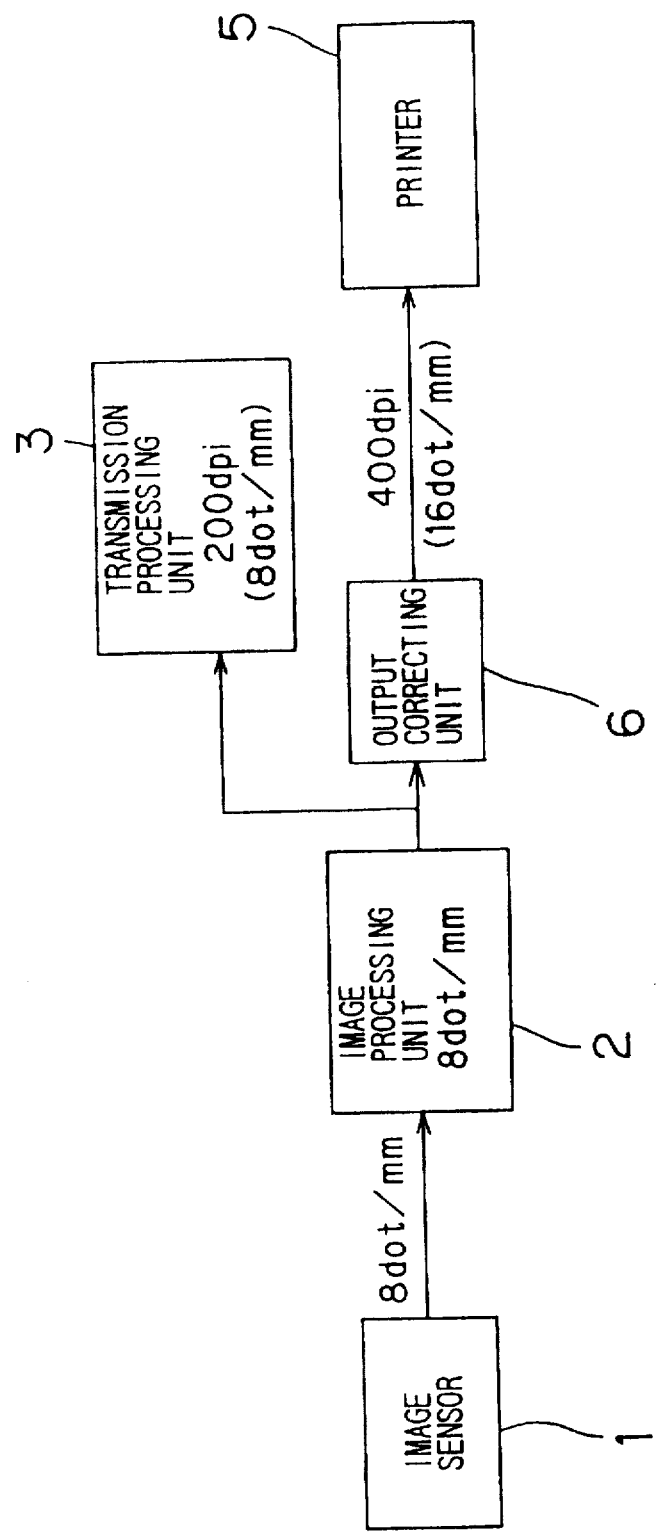
FIG. 5 is a block diagram illustrating an image processing in a facsimile apparatus of prior art.

When the image processing unit 22 is later replaced with a 16-dot/mm image processing unit with a high performance in the apparatus shown in FIG. 1, the entire arrangement may be set as shown in FIG. 3. FIG. 4 is a timing chart illustrating the operation of the system shown in FIG. 3. When the image processing unit is replaced with an image processing unit 31 capable of a 16-dot/mm image processing as shown in FIG. 3, the resolution is not converted by the resolution converting unit 21, but a sensor input 11 can be supplied, as it is, to the image processing unit 31. Provision may be made such that the image processing unit 31 can execute a processing at sysclk identical with the reading clock. Thereafter, the data can be transmitted in 400 dpi from a transmission processing unit 32 or printed out by a printer 33 without output correction.

As thus discussed, the facsimile apparatus having the arrangement in FIG. 1 can be later changed to a system with a resolution of 16 dots/mm. Such an arrangement assures a high resolution image without resolution conversion required.

Although the present invention has been described and illustrated in detail, it is clearly understood that the same is by way of illustration and example only and is not to be taken by way of limitation, the spirit and scope of the present invention being limited only by the terms of the appended claims.

We claim:

1. An image processing apparatus comprising:

image data reading means for optically reading image data with higher resolution;

means for converting said image data read by said image data reading means into digital data;

resolution converting means for converting said higher resolution image data into lower-resolution image data such that said lower-resolution image data are matched with a lower-resolution device disposed downstream of said resolution converting means;

image processing means for executing a predetermined image processing on said image data of which resolution has been converted into lower resolution by said resolution converting means, and said image processing apparatus having a plurality of optional image processing modes which are presettable prior to operation of said resolution conversion means, and said resolution converting means having a plurality of different resolution converting manners for converting higher resolution image data to lower resolution image data according to different resolution conversion techniques with the resolution conversion technique to be utilized amongst said different techniques being chosen and set according to a pre-set one of said presettable image processing modes.

2. An image processing apparatus according to claim 1, wherein said resolution converting means includes both a pixel thinning processing technique and a pixel averaging processing technique within said plurality of different resolution converting manners.

3. An image processing apparatus according to claim 1, wherein said resolution converting means converts the resolution by a pixel thinning processing resolution conversion technique when a binary mode is set, as the image processing mode, in said image processing apparatus; and wherein said resolution converting means converts the resolution by a plural pixel averaging processing resolution conversion technique when a half-tone mode is set, as the image processing mode, in said image processing apparatus.

4. An image processing apparatus according to claim 1, further comprising an image transmission processing unit in communication with said image processing means and a printer also in communication with said image processing means.

5. An image processing apparatus according to claim 4 wherein said transmission processing unit and said image processing means have a uniform data resolution and said printer has a higher resolution than said transmission processing unit.

6. An image processing apparatus according to claim 5 wherein said transmission processing unit and said image processing means each are limited to data resolutions of 200 dpi and said printer has a data resolution of 400 dpi.

7. An image processing apparatus according to claim 1 wherein said means for converting said image data into digital data outputs to said resolution converting means.

8. An image processing apparatus according to claim 1 wherein the predetermined image processing executed by said image processing means is selected from a group consisting of:

a. a shading correction processing;

b. an area separating processing;

c. a zoom processing;

d. a smoothing processing;

e. an error diffusion processing;

f. an isolation processing; and g. a removal processing.

9. A method of converting with an image processing apparatus resolution of image data read by an optical scanner from higher resolution into lower resolution and for performing image processing with image processing means on the converted data, comprising the steps of:

setting an image processing mode for said image processing apparatus converting analog image data supplied from an optical scanner into digital image data;

converting with a resolution converter the resolution of said image data from higher resolution to lower resolution based on a selected one of a plurality of resolution converting techniques of said resolution converter, which selected one of a plurality of resolution converting techniques is set according to the image processing mode set in said step of setting an image processing mode, and said converting to lower resolution occurring before a predetermined image processing is executed by the image processing means on said image data; and said method further comprising the step of executing with the image processing means the predetermined image processing on said lower-resolution image data after the resolution thereof has been converted.

10. A resolution converting method according to claim 9 further comprising selecting one of a pixel thinning processing mode and a pixel averaging mode as the selected resolution converting technique.

11. A resolution converting method according to claim 9, wherein the resolution converting step comprises a pixel thinning processing as the resolution converting technique when a binary mode is set as the image processing mode in said image processing apparatus, and wherein the resolution converting step comprises a plural pixel averaging processing as the resolution converting technique when a half-tone mode is set as the image processing mode in said image processing apparatus.

12. A resolution converting method according to claim 9 wherein said resolution converter converts digitalized image data.

13. A resolution converting method according to claim 9 wherein the predetermined image processing executed on the converted lower-resolution image data is selected from a group consisting of:

a. a shading correction processing;

b. an area separating processing;

c. a zoom processing;

d. a smoothing processing;

e. an error diffusion processing;

f. an isolation processing; and g. a removal processing.

14. An image processing apparatus comprising:

image data reading means for optically reading image data with higher resolution;

means for placing said image data read by said image data reading means into digital data;

a resolution converter in communication with said image data reading means for converting the optical read, high resolution image data to lower resolution image data, said resolution converter including a plurality of optional resolution conversion techniques which can be set for making, in different ways, the conversion from the higher resolution image data to the lower resolution image data;

image processing means for executing an image processing on said image data which has been converted from high-resolution to low resolution by said resolution converter, and said resolution converter being arranged such that a resolution converting technique of said resolution converter is set based on a selection of one of a plurality of image processing modes of said image processing apparatus and such that a change in selection to another one of said plurality of image processing modes results in a change to another resolution converting technique.

15. An image processing apparatus according to claim 14 wherein the optional resolution conversion techniques of said resolution converter comprises both a pixel thinning conversion technique and a pixel averaging conversion technique.

16. An image processing apparatus according to claim 14 wherein said image processing modes of said image processing apparatus includes a half-tone image processing mode and a binary image processing mode, and said resolution converter is arranged so as to be set at said pixel thinning conversion technique when said image processing mode is said binary image processing mode and said resolution converter is set at said pixel averaging mode when said half-tone image processing mode is set.

17. An image processing apparatus according to claim 14 wherein said resolution converter converts digital data received from said means for placing.

18. An image processing apparatus according to claim 14 wherein the predetermined image processing executed by said image processing means is selected from a group consisting of:

a. a shading correction processing;

b. an area separating processing;

c. a zoom processing;

d. a smoothing processing;

e. an error diffusion processing;

f. an isolation processing; and g. a removal processing.

\* \* \* \* \*